INVENTOR.
GEORGE D. HEDGES
ATTORNEY

March 3, 1964  G. D. HEDGES  3,122,946
POWER TRANSMISSION
Filed Dec. 27, 1960  3 Sheets-Sheet 3

INVENTOR.
GEORGE D. HEDGES
BY
ATTORNEY

United States Patent Office 3,122,946
Patented Mar. 3, 1964

3,122,946
POWER TRANSMISSION
George D. Hedges, Roseville, Minn., assignor to Minneapolis-Honeywell Regulator Company, Minneapolis, Minn., a corporation of Delaware
Filed Dec. 27, 1960, Ser. No. 78,680
15 Claims. (Cl. 74—805)

This invention relates to power transmission and more specifically to reduction gearing.

An object of my invention is to provide a novel gearing arrangement for selectively transmitting rotational power from a single input source to either of two output members, having a very high gear ratio, few components, small volume, and low weight.

Another object of my invention is to provide, in such an arrangement, means for locking one of the output members, and permitting the other to rotate a predetermined amount and then to lock that member and unlock the first to permit it to rotate.

Other objects, advantages, and features of novelty not particularly enumerated above which characterize my invention are pointed out with particularity in the claims annexed hereto and forming a part hereof. For a better understanding of the invention, its objects and advantages attained by its use, reference should be had to the subjoined drawing, which forms a further part hereof, and to the accompanying descriptive matter, in which I have illustrated and described a preferred embodiment of my invention.

FIGURES 4, 5, and 6 are schematic views showing a locking and phasing operation in my invention.

Figure 7:
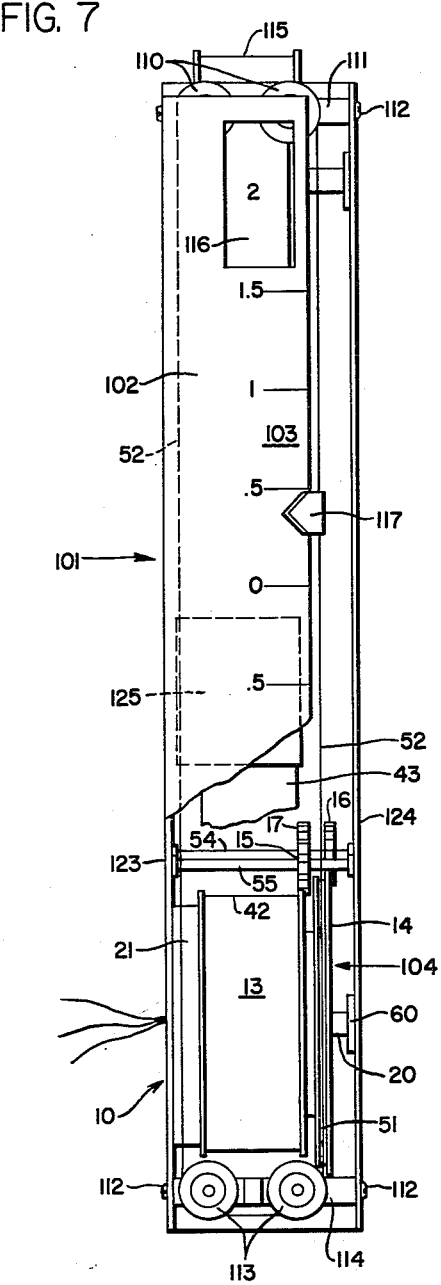

FIGURE 7 is a partially broken away front view of an indicator which utilizes the preferred embodiment of my invention.

Figure 8:
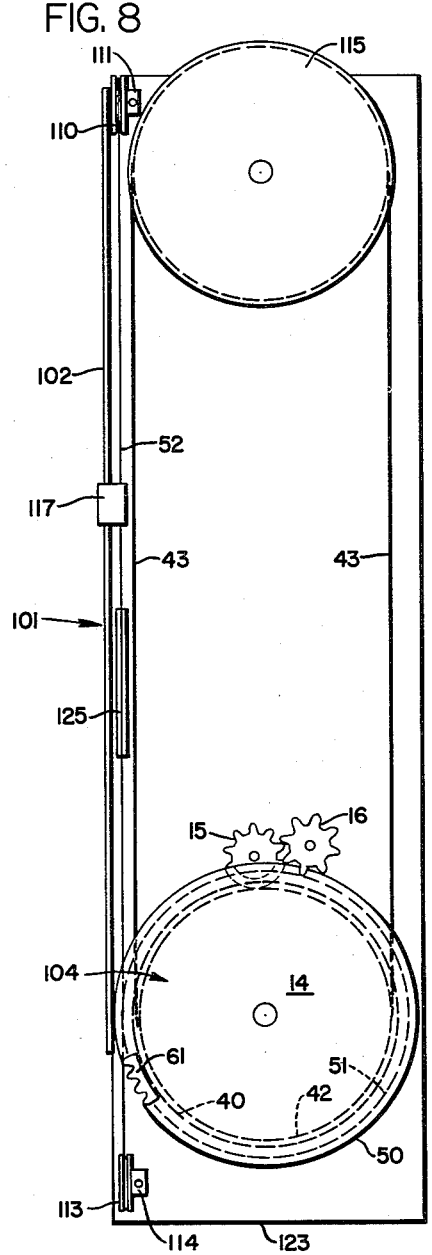

FIGURE 8 is a side view taken from the right of FIGURE 7 with a right frame member of the indicator removed.

Figure 1:
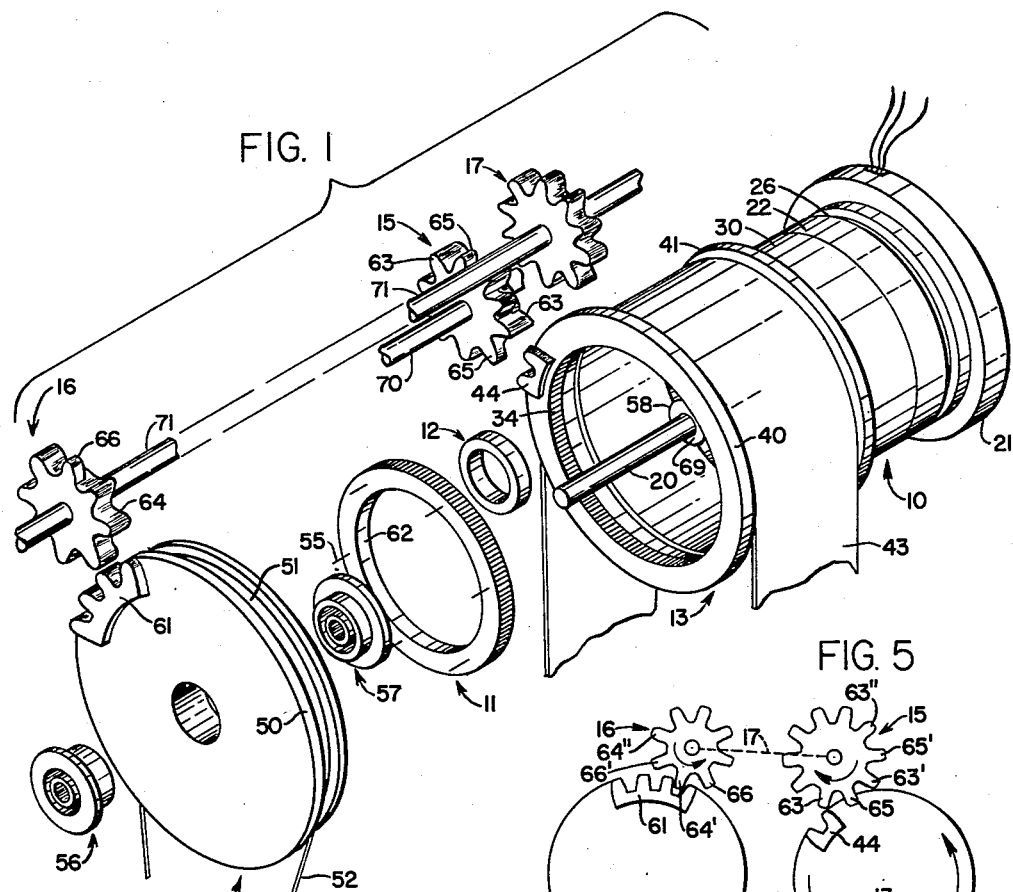
FIGURE 1 is an exploded view of an assembly showing a preferred embodiment of my invention.
Figure 2:
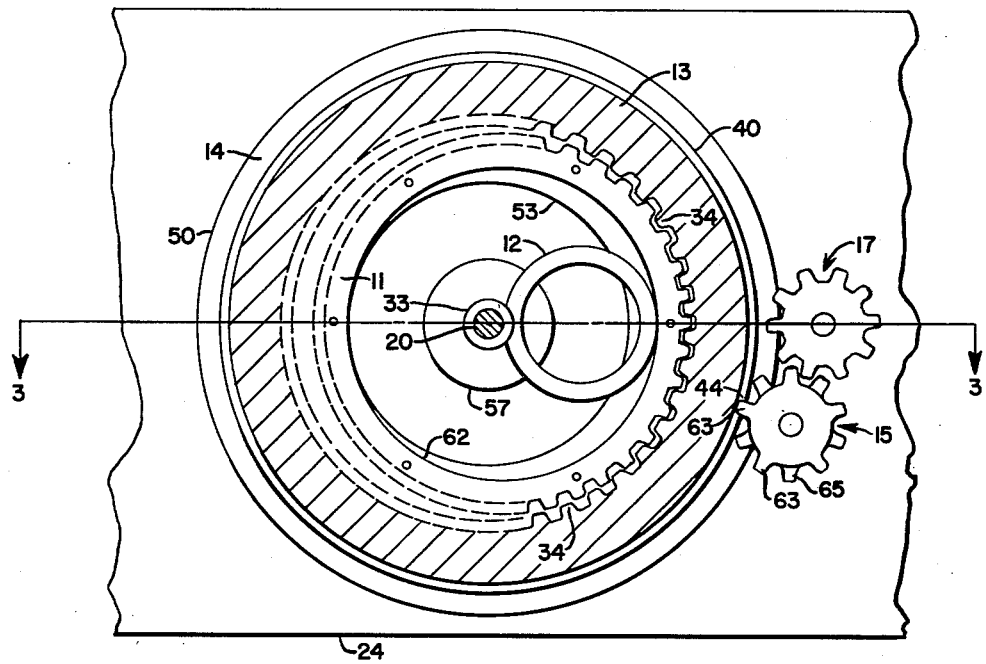
FIGURE 2 is a transverse sectional view of the device taken along line 2—2 of FIGURE 3.
Figure 3:
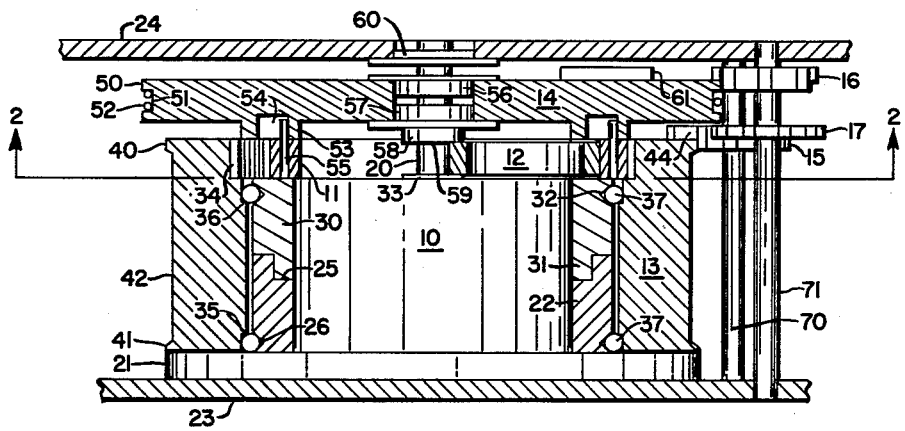
FIGURE 3 is a longitudinal section of the apparatus taken along line 3—3 in FIGURE 2.

As shown in FIGURE 1, the principal components of one embodiment of my invention are a motor 10, a rigid ring gear 11, a planetary ring 12, an output drum 13, an output member 14, locking pinions 15 and 16, and phasing pinion 17. The relationship between these components can more readily be seen by referring to FIGURES 2 and 3.

Motor 10 has a cylindrical output shaft 20 and a housing which includes a base portion 21 and a cylindrical projection 22 concentric with motor shaft 20. Base 21 is rigidly attached by appropriate means to a frame member 23, which with a second frame member 24 supports the entire device. Projection 22 extends upward to approximately half the heighth of the motor and at the upper end is relieved to form a cylindrical slot 25. At the lower end, projection 22 is formed with a V groove 26. A sleeve 30 slips over the motor to form the upper portion of the housing. A section of reduced diameter 31 on sleeve 30 fits into slot 25 of projection 22. A V groove 32 is formed at the upper end of sleeve 30. A central hub 33, concentric with shaft 20, is formed at the upper end of motor 10.

Hollow drum 13 is inwardly ledged at the upper end and internal gear 34 is formed in the ledge. Shoulders 35 and 36 are also formed on the interior surface of drum 13 and cooperate with grooves 26 and 32 respectively to form a set of channels for antifriction balls 37. Drum member 13 is mounted on motor 10 and held in place by the antifriction balls 37. In assembly, drum 13 is placed over the motor and balls 37 are placed in the channel formed by groove 26 and shoulder 35. Then additional balls 37 are placed in groove 32 of sleeve 30 and the sleeve is slipped over motor 10 until portion 31 contacts the bottom of slot 25, and balls 37 engage shoulder 36. Drum 13 is thus rotatably mounted on motor 10 concentric with shaft 20.

A portion of the outer surface of drum 13 is cut away to define a track 42 for an indicator tape 43 and rim portions 40 and 41 adjacent it at the upper and lower ends of drum 13 respectively. Two gear teeth are formed on a segment 44 of rim 40 and are made to extend slightly beyond the end of the drum.

Output member 14 is a short cylindrical member having an outer periphery 50 on which is formed a groove 51 which serves as a track for an index wire 52. Extending from the lower surface of member 14 is a cylindrical portion 53, of reduced diameter, having a plurality of axially extending apertures 54 adapted to receive a like plurality of pins 55 of smaller diameter, projecting from the abutting face of ring gear 11, to permit limited revolution of gear 11 about the center of member 14 without allowing substantial rotation with respect thereto.

Member 14 is bored centrally to receive flanged ball-bearing members 56 and 57. Shaft 20 includes an enlarged radius section 58 spaced axially from hub 33 to allow ring 12 to fit therebetween and having inner and outer shoulders 59 and 69 respectively. Bearing 57 is placed on the shaft with its flanged portion toward section 58 and is positioned so shoulder 69 is abutted by the inner race of bearing 57. Output member 14 is then placed on shaft 20 with the main portion of bearing 57 extending into its central bore. Then bearing 56 is placed on shaft 20 with its main portion extending downward into the central bore of member 14 and its flanged portion engaging the upper surface of that member. Output member 14 is thus rotatably mounted on shaft 20. Shaft 20 extends axially beyond bearing 56 and is rotatably mounted in frame member 24 by another bearing 60.

Four gear teeth are formed on a segment 61 of periphery 50 of member 14 and extend axially beyond one end of the member.

Ring 12, which is positioned axially between hub 33 and shoulder 59 of section 58, is of such an outside diameter that it frictionally transmits rotation from shaft 20 to a bore 62 in gear 11 and maintains radial engagement between gears 11 and 34.

Pinion members 15 and 16 each include two types of gear teeth: teeth 63 and 64 on members 15 and 16 respectively are of a first type and extend the full face width or axial length of the pinion, while teeth 65 and 66 on members 15 and 16 respectively are of a second type and are cut away to extend only about half the axial length of the pinion members. Pinion 15 is comprised of 10 teeth, five of the first type, and five of the second type, alternately arranged about the pinion. Pinion 16 is comprised of six teeth of the first long type and two of the short type, the two latter teeth being placed diametrically opposite each other on the pinion. Pinions 15 and 16 are fixed to shafts 70 and 71 respectively which are rotatably mounted on frame members 23 and 24. Pinion 17, which is also fixed to shaft 71, is a normal pinion, having all its teeth of the same length, and is continuously in engagement with pinion 15. Hence when either pinion 15 or pinion 16 rotates, the other of the two is caused to rotate in the opposite direction.

Pinion member 15 is mounted so that it engages the gear teeth of segment 44 on drum 13, and pinion member 16 is mounted to engage the teeth of segment 61 on member 14. In each case, the pinions are mounted so that the short gear teeth 65 and 66 engage only the portions of the gear teeth of segments 44 and 61 which extend beyond the ends of their respective members, but so that the longer teeth 63 and 64 engage the entire length of the teeth of segments 44 and 61.

In operation, either the tape drum 13 or output member 14 can be driven by rotation of shaft 20 when the other of the output members is prevented from rotating. In this embodiment of my invention, pinion members 15 and 16 cooperate with the gear teeth of segments 44 and 61 to provide means for indexing and locking the two output members.

For a better understanding of the operation of my invention, reference should also be had to FIGURES 4, 5, and 6, which are schematic drawings showing the sequence of events in the indexing and locking of the output members. In FIGURE 4, a full tooth 63 on pinion 15 is meshing with the gear teeth of segment 44 of drum 13. Meanwhile one of the short teeth 66 on pinion 16 is passing beyond the end of output member 14 while the full teeth 64 and 64' on either side of it are riding on rim 50 of member 14. Since pinion members 15 and 16 are geared together by pinion 17 member 14 is free to rotate but drum 13 is locked. If motor 10 is running with shaft 20 rotating in a counterclockwise direction, ring 12 (FIGURE 2) rolls between shaft 20 and bore 62 causing ring gear 11 to revolve eccentrically about the shaft. The mesh point of gears 11 and 34 is always radially outward from the point of contact between bore 62 and ring 12. As the ring revolves once about shaft 20, this mesh point moves once about the periphery of gear 34. Since drum 13, and hence gear 34 is locked, ring gear 11 rotates in a clockwise direction an amount equal to the difference in the number of teeth on gear 11 and the number of teeth on gear 34. Gear 11 is attached to output member 14, and hence member 14 is caused to rotate with gear 11.

As member 14 completes a clockwise rotation, pinion 16 advances one tooth in a counterclockwise direction and occupies the position shown in FIGURE 5. Full tooth 64' on pinion 16, which was formerly riding on rim 50, is now in engagement with the first two teeth of tooth segment 61. Pinion 15 has now advanced one tooth in a clockwise direction so that a short tooth 65 is passing beyond the end of drum 13 and full teeth 63 and 63' on either side of it are riding on rim 40 of drum 13. Drum 13 is thus free to rotate but member 14 is locked to prevent its rotation. Under these conditions, the motion of ring 12 again causes ring gear 11 to revolve about the center of shaft 20, but since output member 14 is locked to prevent its rotation, ring gear 11 is also prevented from rotating. As ring 12 revolves once about shaft 20, the mesh point between gears 11 and 34 moves once around the periphery of gear 34 and causes drum 13 to rotate in a counterclockwise direction an amount equal to the difference between the number of teeth on gear 34 and the number of teeth on gear 11.

When drum 13 has completed one rotation, pinions 15 and 16 each advance one tooth so that a full tooth 66' of pinion 16 engages the second and third teeth of segment 61 and full tooth 63' of pinion 15 engages the teeth of segment 44. Since both pinions and both output members are now free to rotate, they each advance one further tooth to the position shown in FIGURE 6. Here full tooth 64" of pinion 16 is in engagement with the last two teeth of segment 61, and a short tooth 65' of pinion 15 is passing beyond the end of drum 13. Meanwhile full teeth 63' and 63" of pinion 15, on either side of tooth 65', are riding on rim 40. Hence drum 13 is free to make almost one more complete rotation, while member 14 is locked to prevent its rotation.

In the embodiment of my invention as described above, which was designed for use in an indicating device, the movement of member 14 was limited to approximately one rotation, and the movement of drum 13 was limited to approximately two rotations. Obviously, many variations may be had by simply changing the number of teeth on segments 44 and 61, of members 13 and 14, and by modifying pinion members 15 and 16. For some applications, it may even be desirable to omit the locking arrangement provided by gear segments 44 and 61 and pinions 15, 16 and 17, and to accomplish the desired function by suitable manually or otherwise externally controlled locking and phasing devices.

While in the above description reference is made to the motor rotating in a CCW direction, it should be understood that the device operates equally well with CW rotation of the motor. In this case the rotation of each of the components is in the opposite direction to that indicated in the above description.

It will be seen from the description above, that my invention comprises a differential drive in which, with rotational input from shaft 20, an output is obtained from either of the output members 13 or 14 when the other is prevented from rotating.

A general formula may be derived to give the total gear reduction (R) in my device as follows:

$$R = \left[\frac{D_b}{D_s} + 1\right] \times \frac{N_r}{N_r - N_f}$$

where $D_b$ = diameter of bore 62.
$D_s$ = diameter of shaft 20.
$N_r$ = number of teeth on the rotating gear.
$N_f$ = number of teeth on the fixed gear.

For one embodiment of my invention, gear 34 had 149 teeth, gear 11 had 148 teeth and the diameter of bore 62 was 11.9 times as large as the diameter of shaft 20. In this case, with output number 14 locked, and drum 13 free to rotate, the reduction from shaft 20 to drum 13 was:

$$\left[\frac{11.9}{1} + 1\right] \times \frac{149}{149 - 148} = 1922:1$$

In the same embodiment, with drum 13 locked and member 14 free to rotate, the reduction from shaft 20 to member 14 was:

$$\left[\frac{11.9}{1} + 1\right] \times \frac{148}{148 - 149} = -1910:1$$

The negative sign above is significant in that in this case member 14 rotates in the opposite direction of input shaft 20. It is obvious that a wide range of reduction ratios can be obtained by varying the number of teeth in gears 11 and 34, and by varying the diameter of the shaft, bore, and ring.

As seen above, ring 12 provides a substantial part of the total gear reduction in the device. It also holds gears 11 and 34 in mesh, and transmits rotary motion from shaft 20 to bore 62. In addition, ring 12 has a wall thickness and resilience such that in case of undue stress the ring may flatten out and pass between shaft 20 and bore 62 on the opposite side of the mesh point without transmitting any rotary motion, thereby serving as an automatic clutch to prevent damage due to overload. However, if this feature is not desired, a solid disc may be used, and the disc may even be toothed to engage gear teeth formed on shaft 20 and bore 62. If the gear reduction provided by ring 12 is not desired, it is obvious that shaft 20 may be fitted with an eccentric member to engage bore 62 directly to cause it to revolve about the center of the device at the same speed as shaft 20.

Since large gear reduction is obtained by the use of only a few components instead of through the use of many pairs of gears, my arrangement has a minimum of back lash, is very compact in size, and adds only a small amount of weight to the system. Power may be taken from the device through either of the two output members 13 and 14 by locking the other, and motor 10 can drive either of the output members in either direction, but the transmission is irreversible; rotational input supplied to an output member will not be transmitted to shaft 20.

My invention has application in many areas of power transmission, one mode of which is indicating devices such as that shown in FIGURES 7 and 8. In FIGURE 7, an indicator 101, having side frame members 123 and 124 and a front member 102, is shown as viewed from the front. The left edge, as viewed in FIGURE 7, of front member 102 is attached to side 123 and member 102 extends across the front of the index, but has a width somewhat less than the total width of the indicator so the right edge is not attached to the frame and henceforth will be referred to as the free edge of member 102. A fixed scale 103 having a zero point at the center and with positive indications extending in one direction therefrom and negative indications in the opposite direction therefrom is printed on member 102. A portion of member 102 including part of the negative end of scale 103 has been broken away to render visible the differential power transmission 104 which drives the indicator. Power transmisison 104 is the unit shown in detail in FIGURES 1, 2, and 3, and previously described herein. FIGURE 8 is a side view of indicator 101 as taken from the right of FIGURE 7 except that in FIGURE 8 side member 124 has been removed to make the internal components of the indicator visible.

Base member 21 of motor 10 is fixed to frame member 123 at the lower end of the device and shaft 20 is rotatably mounted on frame member 124 by bearing 60. At the upper end of the indicator, as viewed in FIGURE 7, a pair of idler pulleys 110 are rotatably mounted on a cross member 111 which is in turn fixed to frame members 123 and 124 by appropriate means such as screws 112. Similarly, at the lower end of indicator 101 and slightly behind member 102, a pair of idler pulleys 113 are rotatably mounted on a member 114 which is also fixed to members 123 and 124 by screws 112. Pulleys 110 and 113 are located so that they occupy the four corners of a rectangle which lies in a plane spaced somewhat behind and parallel to the plane of front member 102. Index carrying wire 52 passes over idlers 110 and 113 and follows the rectangular path determined by the position of the idlers and then makes one turn about groove 51 of output member 14 which is located in a plane parallel to the right side of the aforesaid rectangle as seen in FIGURE 7 and perpendicular to its plane.

A continuation of scale 103, in compressed form, in both positive and negative directions, is printed on endless tape 43 which is driven by drum 13 and runs over an idler drum 115 which is located at the upper end of the indicator. Tape 43 is located immediately behind the plane described by the path of index carrying wire 52 and is visible from the front of the indicator through window 116 which is formed by removing a rectangular portion from the upper end of member 102. A similar window at the opposite end of member 102 is not seen in FIGURE 7 because it is located in the broken-away portion at the lower end of member 102.

An index 117 is attached to wire 52 and is shaped so that it extends around the unattached edge of front member 102 and has a pointer to indicate values on fixed scale 103. Also attached to wire 52, on the opposite side of the rectangle described by the position of wire 52 from index 117, is a shutter 125. Because of their positions on the opposite sides of the rectangle formed by wire 52, it is obvious that if wire 52 is driven to cause index 117 to move in an upward direction, shutter 125 moves in a downward direction, and conversely if index 117 is caused to move in a downward direction, shutter 125 moves upward. These members are positioned on wire 52 so that when index 117 is adjacent either the upper or lower limit scale 103, shutter 125 covers the window at the opposite end of scale 103.

At the normal or null condition of indicator 101, index 117 gives a zero reading on scale 103. At this time drum 13 is locked by pinion 15 as described previously, and output member 14 is free to make one-half rotation in either direction in response to rotation of shaft 20. If a signal is now supplied to motor 10, member 14 rotates and index 117 is driven in the appropriate direction along scale 103. If the signal is discontinued before index 117 reaches one of the limits of fixed scale 103, the index merely stops at the time the signal ceases and is again free to move in either direction in response to further signals supplied to motor 10.

If, however, the signal continues to be supplied to motor 10 until index 117 reaches one of the limits of scale 103, shutter 125 closes off the window at the opposite end of the scale, output member 14 is locked by pinion 16, and drum member 13 begins to rotate and hence to drive tape 43. Tape 43 then passes behind the open window and appropriate readings are visible thereon. Drum 13 is now free to make approximately two rotations without substantial movement of the index 117. In this particular application, the condensed scale on tape 43 is of sufficient length to require two rotations of drum 13 to reach the limit of the scale.

Thus an automatic change of scale factor is obtained to permit uninterrupted readout over the entire range of the instrument. Closure of one of the windows by shutter 125 during any period when readout is made from tape 43 through the other window, prevents the viewer from receiving an erroneous indication due to observation of the tape through the wrong window.

While I have shown and described specific embodiments of my invention herein, I wish it to be understood that this is for illustrative purposes only and that my invention is to be limited solely by scope of the appended claims.

I claim:

1. Power transmitting apparatus comprising: a first rotatable hollow cylindrical output member having an internal gear on the interior surface thereof and having a rim portion concentric with the pitch circle of said internal gear and extending radially outward from the exterior surface of said first output member, said rim portion having gear teeth on a segment of the circumference thereof, and extending axially beyond one end of said rim portion; a second rotatable cylindrical output member having gear teeth on a segment of the periphery thereof which extend axially beyond one end of said member, said first and second output members having coincident axes of rotation; an external ring gear continuously meshing with said internal gear and having a smaller pitch diameter, said ring gear having an internal bore concentric with its pitch circle; means mounting said ring gear on said second output member for movement comprising limited revolution about the center of said second output member without substantial rotation with respect thereto; a cylindrical drive member at the center of said internal gear; a cylindrical resilient member frictionally engaging said drive member and the internal bore of said ring gear to cause said movement of said ring gear in response to rotation of said drive member; first and second pinion members, each comprising first and second pluralities of gear teeth, the teeth of said first plurality being axially longer than those of said second plurality; means mounting the first pinion member for engagement with the teeth on the periphery of said second output member so that said second plurality of teeth engage only the portions of the gear teeth on said second output member which extend axially beyond the end of said output member; means mounting the second pinion member for engagement with the gear teeth on the rim of said first output member so that the second plurality of teeth thereon engage only the portions of the gear teeth extending beyond the end of said rim; and gear means connecting said first and second pinion members, so that when a tooth of said first pinion member is in engagement with the teeth on said second output member a pair of said first plurality of teeth of said second pinion ride on the blank segment of the rim of said first output member, thereby locking said second output member when said first output member is free to rotate, and so that when a tooth on said second pinion member is in engagement with the teeth of said first output member a pair of said first plurality of teeth on said first pinion ride on the blank segment of the periphery of said second output member, thereby locking said first output member and unlocking said second output member so that it is free to rotate 2. Power transmitting apparatus comprising: a first hollow cylindrical output member having an internal gear on the interior surface thereof and having gear teeth on a segment of the outer circumference thereof and extending axially beyond one end of said member; a second circular output member having gear teeth on a segment of the periphery thereof which extend axially beyond one end of said member, said first and second output members having axes of rotation which are substantially coincident; an external ring gear continuously meshing with said internal gear and having a smaller pitch diameter, said ring gear having an internal bore concentric with its pitch circle; means mounting said ring gear on said second output member for movement comprising limited revolution about the center of said second output member without substantial rotation with respect thereto; a cylindrical drive member at the center of said first output member; a cylindrical member engaging said drive member and the internal bore of said ring gear to cause said movement of said ring gear in response to rotation of said drive member; first and second pinion members, each comprising first and second pluralities of gear teeth, the teeth of said first plurality being axially longer than those of said second plurality; means mounting the first pinion member for engagement with the teeth on the periphery of said second output member; means mounting the second pinion member for engagement with the teeth on the circumference of said first output member, said pinions being mounted so that said second pluralities of teeth engage only the portions of the gear teeth on said output members which extend axially beyond the ends of said output members; and gear means connecting said first and second pinion members, so that said first output member is locked when said second output member is free to rotate and said second output member is locked when said first output member is free to rotate.

3. Power transmitting apparatus comprising: a first hollow cylindrical output member having an internal gear on the interior surface thereof and having gear teeth on a segment of the outer circumference thereof and extending axially beyond one end of said member; a second cylindrical output member having gear teeth on a segment of the periphery thereof which extend axially beyond one end of said member, said first and second output members having substantially coincident axes of rotation; an external gear continuously meshing with said internal gear and having a smaller pitch diameter; means mounting said external gear for movement comprising limited revolution about the center of said second output member without substantial rotation with respect thereto; input means for causing said movement of said external gear; first and second pinion members each comprising first and second pluralities of gear teeth, the teeth of said first plurality being axially longer than those of said second plurality; means mounting the first pinion member for engagement with the teeth on the periphery of said second ouptut member; means mounting the second pinion member for engagement with the teeth on the circumference of said first output member, said pinions being mounted so that said second pluralities of teeth engage only the portions of the gear teeth on said output members which extend axially beyond the ends of said members; and means mechanically connecting said first and second pinion members.

4. Power transmitting apparatus comprising: a first hollow cylindrical output member having an internal gear on the interior surface thereof and having gear teeth on a segment of the outer circumference thereof which extend axially beyond the end of said member; a second cylindrical output member having gear teeth on a segment of the periphery thereof which extend axially beyond one end of said member, said first and second output members having substantially coincident axes of rotation; an external gear continuously meshing with said internal gear and having a smaller pitch diameter; means mounting said external gear for movement comprising limited revolution about the center of said second output member without substantial rotation with respect thereto; input means for causing said movement of said external gear; first and second pinion members each comprising first and second pluralities of gear teeth, the teeth of said first plurality being axially longer than those of said second plurality; means mounting said first pinion member for engagement with the teeth on the periphery of said second output member; means mounting said second pinion member for engagement with the teeth on the circumference of said first output member, said pinion members being mounted so that said second pluralities of teeth engage only the portions of the gear teeth on said output members which extend axially beyond the ends of said members; and means connecting said first and second pinion members to prevent rotation of said first output member beyond limits of rotation predetermined by the number of teeth on the circumferences of said output members and by the relative positions of said first and second pluralities of teeth on said pinion members, and locking said second output member to prevent rotation thereof during rotation of said first output member, said means being further effective to cause locking of said first output member and unlocking of said second output member when said first output member has reached said limits of rotation.

5. Power transmitting apparatus comprising: a first output member having an internal gear on the interior surface thereof; a second output member, said first and second output members having substantially coincident axes of rotation; an external ring gear continuously meshing with said internal gear and having a smaller pitch diameter, said ring gear having an internal bore concentric with its pitch circle; means mounting said ring gear for movement comprising limited revolution about the center of said second output member without substantial rotation with respect thereto; a cylindrical drive member at the center of said first output member; a cylindrical member engaging said input member and the internal bore of said ring gear to cause said movement of said ring gear in response to rotation of said drive member; and means locking said second output member when said first output member is free to rotate and locking said first output member when said second output member is free to rotate.

6. Power transmitting apparatus comprising: a first output member having an internal gear formed on the interior surface thereof; a second output member, the axes of rotation of said first and second output members being substantially aligned; an external gear continuously meshing with said internal gear and having a smaller pitch diameter; means mounting said external gear for movement comprising limited revolution about the center of said second output member without substantial rotation with respect thereto; input means for causing said movement of said external gear, and means connected to said output members and operative between a first condition in which said first output member is locked and said second output member is free to rotate, and a second condition in which said second output member is locked and said first output member is free to rotate.

7. Power transmitting apparatus comprising: a first output member having an internal gear on the interior surface thereof; a second output member, said first and second output members having axes of rotation which are substantially in alignment; an external gear member continuously meshing with said internal gear and having a smaller pitch diameter; means mounting said external gear member for movement comprising limited revolution about the center of said second output member without substantial rotation with respect thereto; means for causing said movement of said external gear member to cause rotation of one of said output members; and means simultaneously preventing rotation of the other of said output members.

8. Power transmitting apparatus comprising: an internal gear; an external gear of smaller pitch diameter continuously meshing with said internal gear; first output means; means mounting one of said gears for movement comprising revolution about the center of said first output means without substantial rotation with respect thereto, the other of said gears and said first output means having axes of rotation which are substantially in alignment; input means to cause said movement of said one of said gears; second output means driven by rotation of said other of said gears; and means locking said first output means when said second output means is free to rotate and locking said second output means when said first output means is free to rotate.

9. In a control device: first and second indicator means, said first indicator means having predetermined limits of movement; a first driving member including an internal gear; means mechanically connecting said first driving member and said first indicator means; a second driving member, said first and second driving members having axes of rotation which are substantially in alignment; means mechanically connecting said second driving member and said second indicator means; an external gear member continuously meshing with said internal gear and having a smaller pitch diameter; means mounting said external gear member for movement comprising limited revolution about the center of said second driving member without substantial rotation with respect thereto; means for causing said movement of said external gear member; and means limiting rotation of said second drive member to prevent movement of said second indicator means beyond said predetermined limits and locking said first driving member during said rotation, said last named means further locking said second drive member and releasing said first drive member when said second indicator means has reached said predetermined limits of movement.

10. In a control device: first and second driven members; a first driving member, said driving member including an internal gear; means mechanically connecting said first driving member and said first driven member; a second driving member, said first and second driving members having axes of rotation which are substantially in alignment; means mechanically connecting said second driving member and said second driven member; an external gear member continuously meshing with said internal gear and having a smaller pitch diameter; means mounting said external gear member for movement comprising limited revolution about the center of said second driving member without substantial rotation with respect thereto; means for causing said movement of said external gear member; and means preventing movement of said first driven member beyond a predetermined limit and locking said second driving member during said movement, said means thereafter locking said first driving member and unlocking said second driving member.

11. In a supervisory device: first and second indicator means; a first driving member; means mechanically connecting said first driving member and said first indicator means; an internal gear; an external gear of smaller pitch diameter continuously meshing with said internal gear; means mounting one of said gears for movement comprising revolution about the center of said first driving member without substantial rotation with respect thereto, the other of said gears and said first driving member having axes of rotation which are substantially in alignment; input means to cause said movement of said one of said gears; a second driving member driven by rotation of said other of said gears; means mechanically connecting said second driving member and said second indicator means; and gear means limiting rotation of one of said driving members to prevent movement of the corresponding indicator means beyond predetermined limits and locking the other of said driving members during said rotation, said gear means further locking said one of said driving members and releasing said other of said driving members to cause movement of said other of said indicator means when said one of said indicator means has reached said limits of movement.

12. In an indicating device: a fixed scale member; a movable index; index carrying means; means attaching said index to said carrying means; means mounting said carrying means for movement along said scale member; a movable tape having a scale printed thereon; means mounting said tape for movement generally behind said scale member, said scale member having spaced window portions cut therefrom to allow viewing of said tape; a tape driving drum member having gear teeth on a segment of the circumference and at one end thereof, said teeth extending axially beyond said end of said drum, said drum member including an internal gear; an index driving member engaging said index carrying means, said member having gear teeth on a segment of the periphery thereof which extend axially beyond one end of said member, said drum member and said index driving member having axes of rotation which are substantially in alignment; an external gear member continuously meshing with said internal gear and having a pitch circle of smaller diameter than said internal gear; means mounting said external gear for movement comprising limited revolution about the center of said index driving member without substantial rotation with respect thereto; drive means for causing said movement of said external gear member; first and second pinion members each comprising first and second pluralities of gear teeth, the teeth of said first plurality being axially longer than those of said second plurality; means mounting said first pinion member for engagement with the teeth on the periphery of said index driving member; means mounting said second pinion member for engagement with the teeth on the circumference of said tape driving member, said pinions being mounted so that said second pluralities of teeth engage only the portions of the gear teeth on said driving members which extend axially beyond the ends of said members; and gear means connecting said first and second pinion members to limit rotation of said index driving member and thereby to prevent movement of said index beyond predetermined limits, said limits being determined by the number of gear teeth on the circumference of said index driving member and by the relative positions of said first and second pluralities of gear teeth on said pinion members, said gear means phasing said pinion members so that said pinion members lock said tape driving member during rotation of said index driving member, and lock said index driving member and unlock said tape driving drum when said index has reached said limits.

13. In an indicating device: a fixed scale member; a movable index; index carrying means; means attaching said index to said carrying means; means mounting said carrying means for movement within predetermined limits along said scale member; a movable tape having a scale printed thereon; means mounting said tape for movement generally behind said scale member, said scale member having a window portion cut therefrom to allow viewing of said tape; a tape driving drum member including internal gear means; an index driving member engaging said index carrying means, said drum member and said index driving member having axes of rotation which are substantially aligned; an external gear member continuously meshing with said internal gear means and having a pitch circle of smaller diameter; means mounting said external gear for movement comprising limited revolution about the center of said index driving member without substantial rotation with respect thereto; drive means for causing said movement of said external gear member; and gear means limiting rotation of said index driving member to prevent movement of said index beyond said predetermined limits, and locking said tape driving member during said rotation, said gear means further locking said index driving member and unlocking said tape driving drum member when said index has reached said predetermined limits of movement.

14. In an indicating device: a fixed scale member, the scale thereon having a zero point at the center and positive indications in one direction therefrom and negative indications in the other direction therefrom; a movable index; means mounting said index for movement along said fixed scale member; a movable tape having a continuation of said scale in compressed form printed thereon; means mounting said tape for movement generally behind said scale member, said scale member having transparent portions at each end of the scale thereon to make portions of said tape scale visible from the front of said indicator; index driving means; tape driving means; means effective to stop the movement of said index when said index has reached either of the extremes of said fixed scale and to simultaneously start movement of said tape in the same direction as the foregoing movement of said index; a shutter member; and means effective to position said shutter member to cover either of said transparent portions when said index has reached the extreme at the opposite end of said fixed scale.

15. Power transmitting apparatus comprising, in combination: a first output member rotatable about an axis, including an internal gear; an external gear having a smaller pitch diameter than said internal gear; means mounting said external gear within said internal gear for meshing therewith; a second output member rotatable about said axis; means interconnecting said second output member and said external gear so as to prevent substantial relative rotation therebetween but not to prevent relative translation therebetween along a circular path whose diameter is equal to the difference between the pitch diameters of the gears; and means for causing said circular translation movement of said external gear, whereby to cause rotation of either output member when the other output member is prevented from rotating.

References Cited in the file of this patent

UNITED STATES PATENTS

| | | |
|---|---|---|
| 606,157 | Belanger | June 21, 1898 |
| 1,192,627 | Hatlee | July 25, 1916 |
| 1,590,166 | Howard | June 22, 1926 |
| 1,811,624 | Ford | June 23, 1931 |
| 2,508,121 | McIver | May 16, 1950 |
| 2,660,428 | Davidson et al. | Nov. 24, 1953 |
| 2,831,373 | Weis | Apr. 22, 1958 |
| 2,881,630 | Opocensky | Apr. 14, 1959 |